United States Patent
Nguyen et al.

(10) Patent No.: US 12,386,042 B2
(45) Date of Patent: Aug. 12, 2025

(54) LIGHT SIGNAL DEFLECTING DEVICE FOR AN OPTICAL MEASURING SYSTEM FOR DETECTING OBJECTS, MEASURING SYSTEM, AND METHOD FOR OPERATING A LIGHT SIGNAL DEFLECTING DEVICE

(71) Applicant: Valeo Schalter und Sensoren GmbH, Bietigheim-Bissingen (DE)

(72) Inventors: Ho-Hoai-Duc Nguyen, Bietigheim-Bissingen (DE); Thomas Schuler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 1004 days.

(21) Appl. No.: 17/437,621

(22) PCT Filed: Mar. 10, 2020

(86) PCT No.: PCT/EP2020/056290
§ 371 (c)(1),
(2) Date: Sep. 9, 2021

(87) PCT Pub. No.: WO2020/182783
PCT Pub. Date: Sep. 17, 2020

(65) Prior Publication Data
US 2022/0196808 A1 Jun. 23, 2022

(30) Foreign Application Priority Data
Mar. 12, 2019 (DE) ...................... 10 2019 106 266.7

(51) Int. Cl.
*G01S 7/48* (2006.01)
*G01S 7/481* (2006.01)
(Continued)

(52) U.S. Cl.
CPC .......... *G01S 7/4817* (2013.01); *G01S 7/4865* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 5,699,150 A | * | 12/1997 | Katayama | G01S 7/4811 359/220.1 |
| 5,898,482 A | * | 4/1999 | Yamabuchi | B60T 7/22 180/169 |
| 2018/0284237 A1 | | 10/2018 | Campbell et al. | |

FOREIGN PATENT DOCUMENTS

| | | |
|---|---|---|
| DE | 4307408 A1 | 11/1993 |
| DE | 102006034907 A1 | 1/2008 |

(Continued)

OTHER PUBLICATIONS

International Search Report and Written Opinion in corresponding International Application No. PCT/EP2020/056290, mailed May 15, 2020 (12 pages).

(Continued)

*Primary Examiner* — Hovhannes Baghdasaryan
(74) *Attorney, Agent, or Firm* — Osha Bergman Watanabe & Burton LLP

(57) ABSTRACT

A light signal redirection device (26) for an optical measurement system (12) for capturing objects (18) in a monitoring region (14), a measurement system (12), and a method for operating a light signal redirection device (26) are described. The light signal redirection device (26) comprises at least one redirection body (32) having at least one redirection region (34) for redirecting light signals (22, 22I, 22II). Furthermore, the light signal redirection device (26) comprises at least one drive device (36) with which the at least one redirection body (32) can be driven in such a way (Continued)

that the at least one redirection region (34) can be moved relative to respective propagation axes (23, 23I, 23II) of light signals (22, 22I, 22II) which are incident on the at least one redirection region (34). At least one redirection region (34) is displaceable along at least one at least partially curved displacement path (38).

11 Claims, 3 Drawing Sheets

(51) Int. Cl.
*G01S 7/4865* (2020.01)
*G01S 17/931* (2020.01)

(56) References Cited

FOREIGN PATENT DOCUMENTS

| DE | 102016010448 A1 | 3/2018 |
|---|---|---|
| WO | 2014/095105 A1 | 6/2014 |

OTHER PUBLICATIONS

German Search Report issued in corresponding German Application No. 10 2019 106 266.7, dated Mar. 6, 2020 (10 pages).

* cited by examiner

LIGHT SIGNAL DEFLECTING DEVICE FOR AN OPTICAL MEASURING SYSTEM FOR DETECTING OBJECTS, MEASURING SYSTEM, AND METHOD FOR OPERATING A LIGHT SIGNAL DEFLECTING DEVICE

TECHNICAL FIELD

The invention relates to a light signal redirection device for an optical measurement system for capturing objects in a monitoring region,
- with at least one redirection body having at least one redirection region for redirecting light signals,
- with at least one drive device with which the at least one redirection body can be driven in such a way that the at least one redirection region can be moved relative to the respective propagation axes of light signals that are incident on the at least one redirection region.

The invention further relates to an optical measurement system for capturing objects in a monitoring region,
- with at least one transmission device with which light signals can be generated,
- with at least one light signal redirection device with which light signals can be redirected,
- and with at least one receiving device with which light signals can be received,
- wherein the at least one light signal redirection device has
  - at least one redirection body having at least one redirection region for redirecting light signals, and
  - at least one drive device with which the at least one redirection body can be driven in such a way that the at least one redirection region can be moved relative to the respective propagation axes of light signals that are incident on the at least one redirection region.

The invention additionally relates to a method for operating a light signal redirection device for an optical measurement system for capturing objects in a monitoring region,
- in which light signals are redirected with at least one redirection region of at least one redirection body,
- wherein the at least one redirection body is driven with at least one drive device in such a way that the at least one redirection region is moved relative to the respective propagation axes of light signals that are incident on the at least one redirection region.

PRIOR ART

An optical object capturing device for a motor vehicle is known from WO 2014/095105 A1, with a transmission unit for transmitting a transmission light beam, with a reception unit for receiving a reception light beam, and with an electronic evaluation device for detecting an object external to the vehicle in an area surrounding the motor vehicle depending on the reception beam. The transmission unit has a transmitter for generating the transmission light beam, a controllable micro-oscillating mirror with which the transmission light beam is pivotable at least in one pivoting direction, and a transmission lens arranged in the transmission beam path behind the micro-oscillating mirror.

The invention is based on the object of designing a light signal redirection device, a measurement system, and a method of the type mentioned in the introductory part, with which light signals can be redirected better, in particular more easily, more reliably and/or more securely.

DISCLOSURE OF THE INVENTION

According to the invention, this object is achieved in the light signal redirection device in that at least one redirection region is displaceable along at least one at least partially curved displacement path.

According to the invention, a displacement path along which at least one redirection region is displaced has at least one curvature. By correspondingly displacing the at least one redirection body and thus the at least one redirection region along the curvature of the displacement path, an angle of incidence at which the light signal is incident on the at least one redirection region is changed. In this way, the light signal is redirected differently on the curved displacement path depending on the position of the redirection region. In this way, the propagation axes of the light signals can be pivoted by simply displacing the at least one redirection region.

Furthermore, due to the simple structure, an adjustment effort for the light signal redirection device and thus the measurement system can be reduced.

Due to the corresponding curvatures of the at least one displacement path, a corresponding monitoring region of the measurement system can be scanned in a flexible and targeted manner. The monitoring region is defined by the field of view of the measurement system. The field of view of the measurement system can be individually adapted by designing the displacement path accordingly.

Furthermore, the curvature of the at least one displacement path can make it possible to reduce the requirements in terms of the mobility and/or the type of movement of the at least one redirection body as a whole. The service life of the light signal redirection device can thus be increased compared to light signal redirection devices with rotating or oscillating mirrors. In addition, a larger emission surface can be realized with the aid of a corresponding curvature of the at least one displacement path. In this way, the eye safety of the measurement system can be improved.

Advantageously, at least one light signal can be realized in the form of a light pulse. A start and an end of a light pulse can be determined, in particular measured. In this way, it is possible to measure in particular light travel times.

Advantageously, at least one light signal can also contain further information. For example, a light signal can in particular be encoded. In this way, it is easier to identify it and/or for it to carry along corresponding information.

The propagation axis of a light signal indicates the mean direction in which a light signal propagates. The light signal can in this case be focused or expanded with respect to the propagation axis. The light signal can also be focused in one direction and expanded in another direction. In this way, the light signal can be fanned out.

The optical measurement system can advantageously operate in accordance with a light time-of-flight method, in particular a light pulse time-of-flight method. Optical measurement systems operating in accordance with the light pulse time-of-flight method can be designed and referred to as time-of-flight systems (TOF), light detection and ranging systems (LiDAR), laser detection and ranging systems (LaDAR) or the like. Here, a time of flight from the emission of a light signal using a transmission device and the receipt of the corresponding reflected light signal using a corresponding receiving device of the measurement system is measured, and a distance between the measurement system and the captured object is ascertained therefrom.

The optical measurement system can advantageously be designed as a scanning system, in particular a laser scanner.

In this context, a monitoring region can be sampled, that is to say, scanned, with light signals. To this end, the propagation axes of the corresponding light signals can be swept, as it were, over the monitoring region. The light signal redirection device is used for this purpose.

The optical measurement system can be used advantageously in a vehicle, in particular a motor vehicle. The measurement system can advantageously be used in a land-based vehicle, in particular a passenger vehicle, a truck, a bus, a motorcycle or the like, an aircraft and/or a watercraft. The measurement system can also be used in vehicles that can be operated autonomously or partially autonomously. The measurement system can also be used in stationary operation.

The optical measurement system can be used to capture standing or moving objects, in particular vehicles, persons, animals, obstacles, road unevennesses, in particular potholes or rocks, roadway boundaries, free spaces, in particular free parking spaces, or the like.

Advantageously, the optical measurement system can be part of a driver assistance system and/or of a chassis control system of a vehicle or be connected thereto. The information ascertained with the optical measurement system can be used for controlling function components of the vehicle. The function components can be used to control in particular driving functions, in particular steering, a brake system and/or a motor, and/or signaling devices of the vehicle. For example, if an object is captured using the optical measurement system, the corresponding function components can be used to steer the vehicle and/or change the speed thereof, in particular stop it, and/or at least one signal can be output.

In an advantageous embodiment, a direction of the at least one redirection region can follow the curvature of the displacement path when the at least one redirection body is displaced. In this way, the curvature of the displacement path can directly be influence the direction of the at least one redirection region. Thus, an angle of inclination at which one strikes the propagation axis of a light signal in relation to the at least one redirection region can be influenced directly by the curvature of the displacement path.

In a further advantageous embodiment, an extension of the at least one redirection region in the direction of the at least one displacement path can be smaller than an extension of the light signals in this direction. In this way, the extension of the light signals can project beyond the at least one redirection region. The at least one redirection region can thus lie in different positions during the displacement along the at least one displacement path within the extension of the light signals. In this way, the at least one redirection region can always be irradiated with corresponding light signals.

In a further advantageous embodiment, means for absorbing the light signals can be provided in the direction of the light signals that are incident on the at least one redirection region behind, next to and offset behind the at least one redirection region. In this way, scattering of the incident light signals outside the redirection region can be prevented.

The means can advantageously be corresponding light-absorbing surfaces. In this way, light absorption can be realized in a simple manner.

In a further advantageous embodiment, the at least one drive device can have at least one linear drive, or consist thereof.

With a linear drive, the at least one redirection body and thus the at least one redirection region can be displaced along at least one line. Moreover, linear drives can be controlled easily and precisely.

Furthermore, in the case of linear drives, a position of the at least one redirection region can be determined precisely with the aid of encoders. A measure for the redirection of the light signals can be ascertained from the position of the at least one redirection region.

The at least one drive device can advantageously have at least two linear drives. In this way, the at least one redirection region can be displaced along a surface. Advantageously, the at least two linear drives can displace the at least one redirection region in directions that are in particular orthogonal to one another.

Advantageously, at least one drive device can have at least one piezo motor. Piezo motors can be implemented with smaller sizes than electromagnetic motors with comparable performance.

In a further advantageous embodiment, at least one displacement path of at least one redirection region can be curved at least partially concavely and/or at least partially convexly viewed in the direction of the incident light signals. In this way, a corresponding redirection can be specified as required.

The at least one displacement path can be curved exclusively concavely or exclusively convexly in this case.

Alternatively, at least a part of the at least one displacement path can be curved concavely and at least a part of the displacement path can be curved convexly. In this way, corresponding redirection patterns can be specified, with which the propagation axes of the light signals can be swept.

In a further advantageous embodiment, at least one displacement path of at least one redirection region can be curved at least partially parabolically and/or at least partially conically and/or at least partially elliptically and/or at least partially circularly. In this way, individual redirection patterns can be implemented, with which the light signals can be redirected.

Advantageously, the displacement path of at least one redirection region can be curved exclusively parabolically or exclusively conically or exclusively elliptically or exclusively circularly. Alternatively, the displacement path of at least one redirection region can have combinations of the aforementioned or other curvatures.

The displacement path of at least one redirection region can advantageously be shaped freely. An individual redirection pattern for the light signals can thus be implemented with the displacement path.

In a further advantageous embodiment, at least one displacement path can be curved at least partially in one dimension and/or at least one displacement path can be curved at least partially in two dimensions.

The displacement path of at least one redirection region can advantageously be curved at least partially in one dimension. In this way, the propagation axes of the light signals can be swept in one dimension. The monitoring region can thus be scanned in one dimension. A curvature in one dimension can be realized more easily than a curvature in two dimensions.

Alternatively or additionally, a displacement path of at least one redirection region can advantageously be curved at least partially in two dimensions, in particular cylindrically, spherically, ellipsoidally or the like. In this way, the propagation axes of the light signals can be swept in two dimensions. The monitoring region can thus be scanned in two dimensions.

Alternatively, a displacement path of at least one redirection region can have areas in which it is curved in one dimension and areas in which it is curved in two dimensions.

A redirection pattern for redirecting the light signals can thus be specified more individually.

In a further advantageous embodiment, at least one redirection region can be periodically displaceable along the at least one displacement path. In this way, the light signals can be redirected periodically. Thus, the monitoring region can be sampled, that is to say scanned, with light signals by the corresponding periodic displacement of the at least one redirection region.

The at least one redirection region can advantageously be displaced in a harmonically oscillating manner. In this way, a sinusoidal course of the deflection can be realized. The corresponding deflection of the at least one redirection region from a zero position can thus be determined more easily.

In an advantageous embodiment, at least one redirection region can have at least one mirror surface and/or at least one redirection region can have at least one diffractive optical structure.

With mirror surfaces, light signals can be redirected directly, Mirror surfaces can be easily implemented.

With diffractive optical structures, light signals can be shaped, in particular diffracted. In this way, the light signals can be redirected.

Advantageously, at least one diffractive optical structure can be designed as a diffractive optical element. Diffractive optical elements (DoE) can be manufactured individually and be adapted to the corresponding requirements. Diffractive optical elements can be used to achieve targeted and individually prescribable shaping, in particular diffraction, of the light signals.

Advantageously, at least one redirection region can have a transmissive effect for the light signals. In this way, the transmission device and/or the receiving device of the measurement system can be arranged on the side of the at least one redirection region opposite the monitoring region.

Alternatively or additionally, at least one redirection region for the light signals can advantageously have a reflective effect. In this way, the transmission device and/or the receiving device can be arranged on the same side of the at least one redirection region as the monitoring region.

Advantageously, the at least one redirection body and/or the at least one redirection region can comprise or consist of polymer, glass, metal or the like or a combination of different such materials or other suitable materials. Such materials can themselves act as mirror surfaces and/or as carriers of mirror surfaces and/or as carriers, in particular substrates, for diffractive optical structures.

Furthermore, the object is achieved according to the invention in the measurement system in that at least one redirection region is displaceable along at least one at least partially curved displacement path.

According to the invention, at least one displacement path for at least one redirection body and thus for at least one redirection region has at least one curvature, with the result that by displacing the at least one redirection region along the displacement path, the incident light signals are diverted depending on the curvature of the displacement path.

The transmission device can advantageously have at least one light source. The transmission device can advantageously transmit pulsed light signals. In this way, the duration of the light signals can be limited. This makes it easier to implement a time-of-flight measurement, since the beginning and end of the light signal can be precisely determined.

Advantageously, at least one light source can have at least one laser. The laser can advantageously be a semiconductor laser, in particular a surface emitter (VCSEL), an edge emitter, a fiber laser or the like. The laser can be used to emit light signals in frequency ranges that are visible or not visible to the human eye. Furthermore, pulsed light signals can be emitted with a laser. The pulse length can be precisely specified in that case.

At least one transmission device can advantageously have at least one optical system, in particular an optical lens or the like. The optical system can be used to shape the generated light signals, in particular to set a beam divergence.

The at least one receiving device can have at least one receiver, in particular an (avalanche) photodiode, a diode array, a CCD array or the like. Light signals can be converted into in particular electrical signals using such receivers. Electrical signals can be processed with an electronic control and evaluation device of the measurement system.

At least one receiver can advantageously have at least one optical system, in particular an optical lens or a fisheye lens or the like. In this way, light signals that are reflected by at least one redirection region can be better directed onto the receiver.

In one advantageous embodiment, at least one redirection region can be displaceable relative to at least one transmission device and/or at least one redirection region can be displaceable relative to at least one receiving device.

Advantageously, at least one redirection region can be displaceable relative to at least one transmission device. In this way, transmitter light signals can be redirected into the monitoring region using the light signal redirection device.

Alternatively or additionally, at least one redirection region can advantageously be displaceable relative to at least one receiving device. In this way, reception light signals can be redirected to the at least one receiving device using the light signal redirection device. Reception light signals are transmitter light signals that are reflected by an object present for example in the monitoring region.

One and the same redirection region can advantageously be assigned to at least one transmission device and at least one receiving device. In this way, both the transmitter light signals and the reception light signals can be redirected with only one redirection region.

Alternatively, at least one redirection region assigned to at least one transmission device and at least one other redirection region assigned to at least one receiving device can be mechanically connected to one another. In this way, the redirection regions can be driven together. In this way, outlay in relation to drive devices can be reduced.

In addition, the object is achieved according to the invention in the method in that the at least one redirection body is displaced along at least one at least partially curved displacement path, with the result that angles of incidence of the respective propagation axes of light signals on the at least one redirection region are changed and the light signals are redirected.

According to the invention, the at least one redirection region is displaced along at least one displacement path. As a result, the angles of incidence of the respective propagation axes of the light signals on the at least one redirection region are changed, with the result that the light signals are redirected accordingly.

Moreover, the features and advantages indicated in connection with the light signal redirection device according to the invention, the measurement system according to the invention, and the method according to the invention and the respective advantageous configurations thereof apply here in a mutually corresponding manner and vice versa. The individual features and advantages can of course be combined with one another, wherein further advantageous effects can occur that go beyond the sum of the individual effects.

BRIEF DESCRIPTION OF THE DRAWINGS

Further advantages, features, and details of the invention are apparent from the following description, in which exemplary embodiments of the invention will be explained in more detail with reference to the drawing. A person skilled in the art will also expediently consider the features that have been disclosed in combination in the drawing, the description and the claims individually and combine them to form further meaningful combinations. Schematically.

In the figures, identical components are provided with the same reference numerals.

EMBODIMENT(S) OF THE INVENTION

Figure 1:
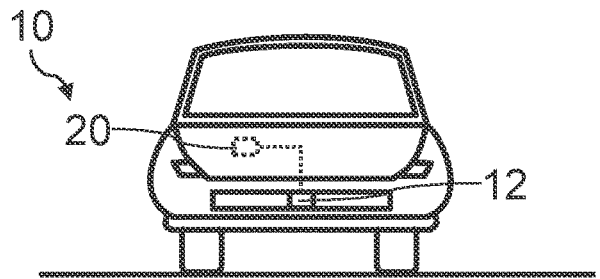
FIG. 1 shows a front view of a passenger vehicle with a driver assistance system and an optical measurement system for monitoring a monitoring region in front of the passenger vehicle in the direction of travel.
Figure 2:
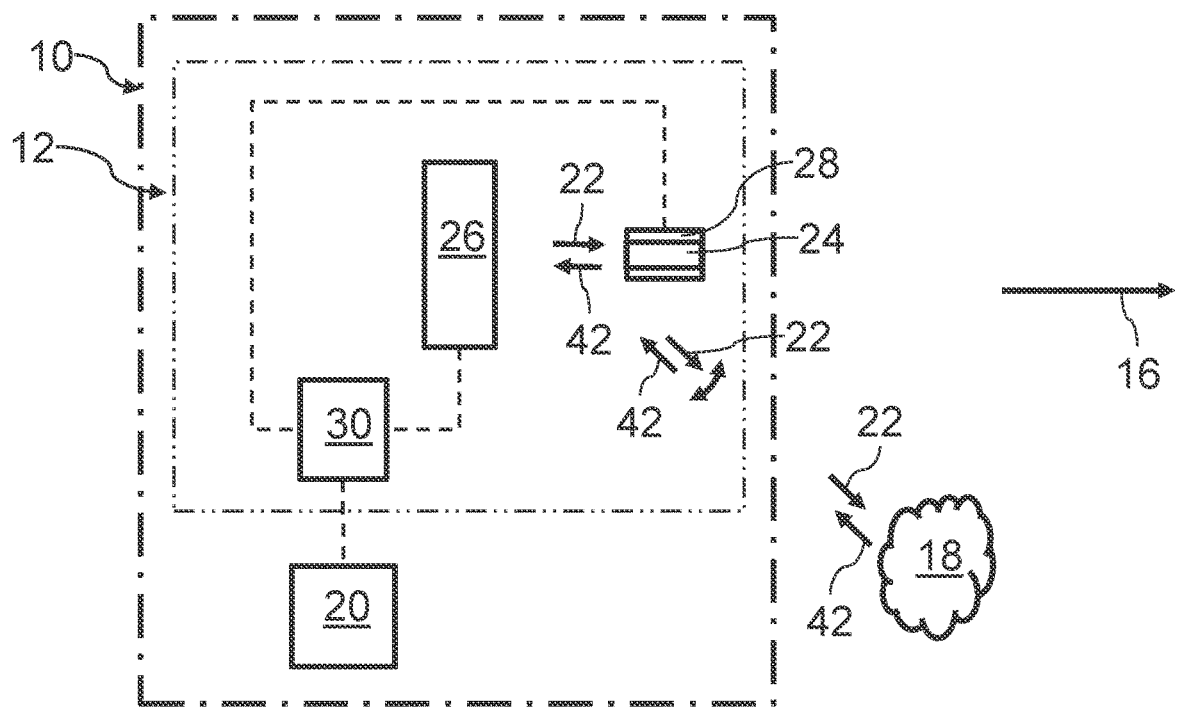
FIG. 2 shows a functional illustration of the passenger vehicle from FIG. 1 with the driver assistance system and the measurement system.

FIG. 1 illustrates a vehicle 10 in the form of a passenger vehicle in a front view. The vehicle 10 has an optical measurement system 12, which is arranged, for example, in the front bumper of the vehicle 10. The optical measurement system 12 can be used to monitor a monitoring region 14, indicated in FIG. 2, in the driving direction 16 in front of the vehicle 10 for objects 18. The monitoring region 14 can be sampled, that is to say scanned, using the optical measurement system 12.

Rather than being arranged in the front bumper, the optical measurement system 12 can also be arranged at another point on the vehicle 10 and directed in a different direction. A plurality of optical measurement systems 12 can also be provided on the vehicle 10.

The objects 18 can be standing or moving objects, for example other vehicles, persons, animals, obstacles, road unevennesses, potholes or rocks, road boundaries, free spaces, free parking spaces or the like.

Furthermore, the vehicle 10 has a driver assistance system 20 with which driving functions, for example steering functions, braking functions and/or motor functions, of the vehicle 10 can be at least partially controlled or a driver can be supported. Furthermore, information can be output to the driver using the driver assistance system 20. The vehicle 10 can be operated autonomously or partially autonomously with the aid of the driver assistance system 20.

The measurement system 12 is connected to the driver assistance system 20 for the transmission of signals. In this way, information obtained with the measurement system 12, for example about objects 18 in the monitoring region 14, can be transmitted to the driver assistance system 20.

The optical measurement system 12 is designed, for example, as a laser scanner. Using the optical measurement system 12, transmitter light signals 22 are sent into the monitoring region 14, for example in the form of laser pulses. The direction of a propagation axis 23, designated as such for example in FIG. 3, of the transmitter light signals 22 into the monitoring region 14 is varied in this case, so that the monitoring region 14 can be scanned as a whole. Using the measurement system 12, distances, directions and speeds of captured objects 18 relative to the vehicle 10 can be ascertained.

The propagation axis of light signals, for example the transmitter light signals 22 and reception light signals 42 explained further below, characterizes the main propagation direction thereof within the meaning of the invention. The light signals themselves can be focused or defocused in relation to the propagation axis.

The measurement system 12 comprises a transmission device 24, a light signal redirection device 26, a receiving device 28 and an electronic control and evaluation device 30. The receiving device 28 can, for example in FIG. 2, viewed in the direction perpendicular to the plane of the drawing, be arranged spatially below the transmission device 24. The receiving device 28 is therefore shown partially covered by the transmission device 24 in FIG. 2.

Figure 3:
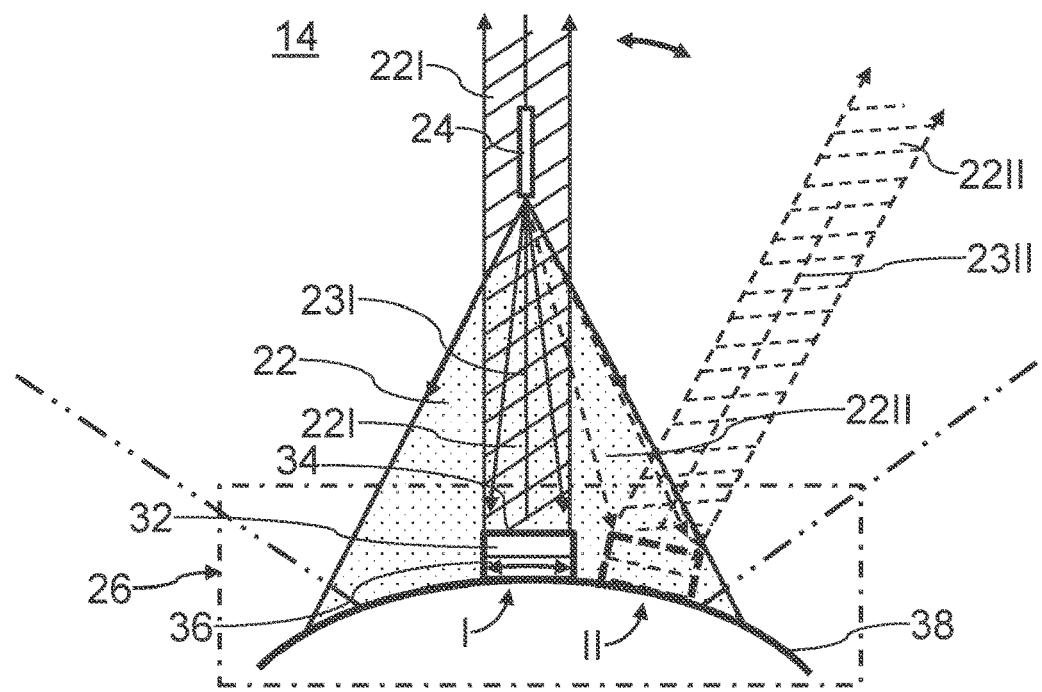
FIG. 3 shows a detailed view of a transmission device and a light signal redirection device of the measurement system from FIGS. 1 and 2 according to a first exemplary embodiment.

The transmission device 24 has a laser, for example a diode laser, with which the transmitter light signals 22 can be generated and transmitted. The transmission device 24 furthermore comprises an optical system, for example having an optical lens, with which the transmitter light signals 22, as shown in FIG. 3, are expanded. The transmission device 24 is connected in a controllable manner to the control and evaluation device 30.

The light signal redirection device 26 with the transmission device 24 is shown in detail in FIG. 3.

The light signal redirection device 26 has a redirection body in the form of a redirection mirror 32 having a mirror surface 34 as a redirection region for redirecting transmitter light signals 22 and reception light signals 42. The mirror surface 34 is located on the side facing the transmission device 24. The redirection mirror 32 can consist of polymer, glass, metal or the like or of a combination of different such materials or other suitable materials.

Furthermore, the light signal redirection device 26 has a drive device 36, for example in the form of a linear piezo motor. The drive device 36 is connected to the redirection mirror 32 in such a way that it can displace the redirection mirror 32 and thus the mirror surface 34 along a curved displacement path 38. In this way, the mirror surface 34 can be periodically pushed back and forth along the displacement path 38, for example in harmonic oscillation, which is indicated by a double-headed arrow. In FIG. 3, the redirection mirror 32 is shown in its zero position I with continuous lines. For comparison, the redirection mirror 32 is shown in dashed lines in FIG. 3 in an exemplary deflection position II.

The displacement path 38 follows, for example, an elliptically curved line. By way of example, the displacement path 38 is concave starting from the transmission device 24, that is to say, viewed in the direction of the transmitter light signals 22.

The mirror surface 34 is located in the beam path of the transmitter light signals 22 behind the transmission device 24. The transmitter light signals 22 are transmitted onto the mirror surface 34. The transmitter light signals 22 are expanded here in such a way that they cover the entire displacement path 38 over which the mirror surface 34 can be displaced. The extension of the mirror surface 34 in the direction of the displacement path 38 is significantly smaller than the extension of the expanded transmitter light signals 22 in the region of the mirror surface 34. In this way, only that part of the transmitter light signals 22 which is incident on the mirror surface 34 is reflected. The region of the light signal redirection device 26 that is located, from the transmission device 24, behind, obliquely behind and next to the mirror surface 34, that is to say the region along the displacement path 38, has light-absorbing properties. In this way it is avoided that parts of the expanded transmitter light signals 22 which are not incident on the mirror surface 34 are likewise reflected.

When the redirection mirror 32 is displaced, the direction of the mirror surface 34 follows the curvature of the displacement path 38. In the exemplary embodiment shown, the mirror surface 34 runs approximately parallel to the displacement path 38. By displacing the mirror surface 34 along the displacement path 38, an angle of incidence of the transmitter light signals 22 on the mirror surface 34 is changed. The part of the transmitter light signal 22 that is incident on the mirror surface 34 is accordingly directed into the monitoring region 14 depending on the position of the mirror surface 34 on the displacement path 38. The corresponding propagation axis 23 is redirected in the process.

As a result of the periodic displacement of the mirror surface 34, the propagation axis 23 of the transmitter light signals 22 in the monitoring region 14 is swept in one dimension. The monitoring region 14 is thus scanned with the transmitter light signals 22 in one dimension.

For the sake of better distinguishability, the transmitter light signals 22 that are reflected at the mirror surface 34 in the zero position I and their redirected propagation axis 23 are provided with the index 1 in FIG. 3, that is to say denoted by 22I and 23I. Accordingly, the transmitter light signals 22 that are reflected at the mirror surface 34 in the deflection position II and their redirected propagation axis 23 are provided with the index II, that is to say are denoted by 22II and 23II, and are also shown in dashed lines.

The light signal redirection device 26 furthermore has a position capturing device (which is of no further interest here), with which the instantaneous deflection of the mirror surface 34 can be captured. The deflection of the mirror surface 34 characterizes the redirecting effect on the transmitter light signals 22.

The light signal redirection device 26, or the drive device 36 and the position capturing device, is connected to the control and evaluation device 30 for the transmission of signals. The light signal redirection device 26 can thus be controlled or regulated with the control and evaluation device 30. In addition, the instantaneous deflection of the mirror surface 34 can be transmitted to the control and evaluation device 30 and processed thereby.

The transmitter light signals 22 can be reflected at an object 18, for example present in the monitoring region 14, and sent back as reflected reception light signals 42 to the light signal redirection device 26. Using the light signal redirection device 26, the reception light signals 42 can be redirected to the receiving device 28.

Figure 4:
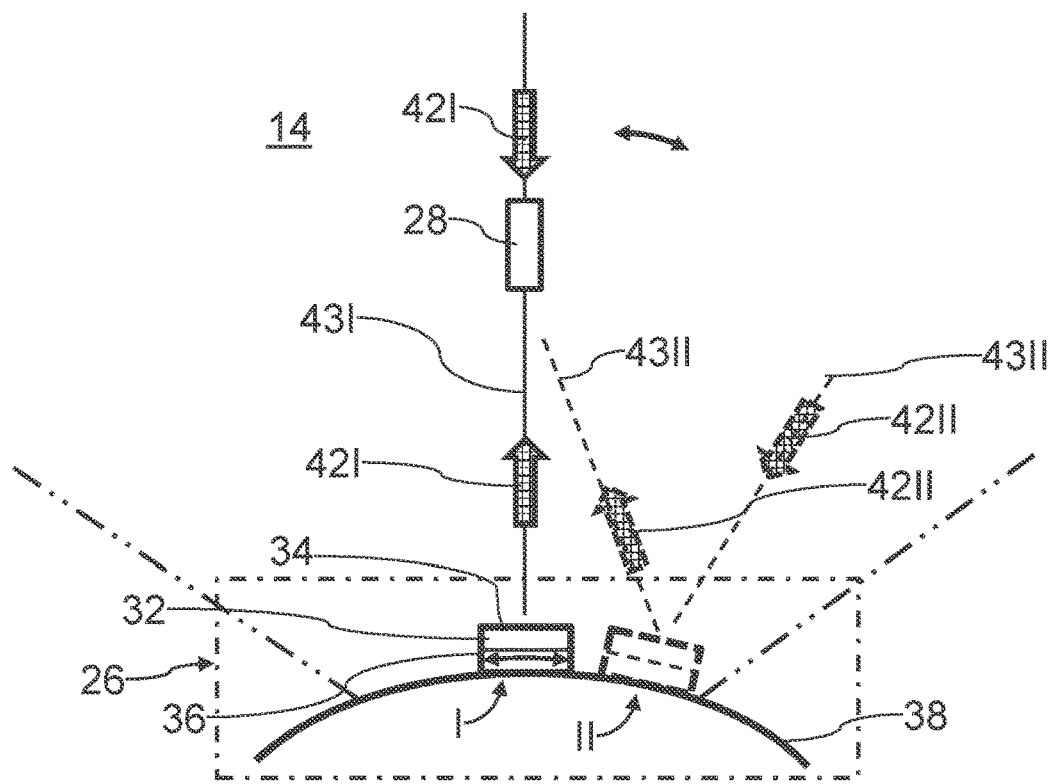
FIG. 4 shows a detailed view of a receiving device of the light signal redirection device of the measurement system from FIGS. 1 and 2 according to the first exemplary embodiment.

FIG. 4 shows the light signal redirection device 26 with the receiving device 28 and the beam path of the reception light signals 42. The mirror surface 34 is shown there by way of example in accordance with FIG. 3 in the zero position I and the deflection position II.

To make it easier to distinguish, the reception light signals 42, which come from the direction into which the transmitter light signals 22I are sent in the zero position I of the mirror surface 34 in accordance with FIG. 3, and their propagation axis 43 are provided with the index 1, that is to say are denoted by 42I and 43I. The reception light signals 42I are incident on the mirror surface 34 and are redirected to the receiving device 28 in accordance with the curvature of the displacement path 38 there.

The reception light signals 42, which come from the direction into which the transmitter light signals 22II are sent in the deflection position II of the mirror surface 34 in accordance with FIG. 3, and their propagation axis 43 are provided with the index II, that is to say are denoted by 42II and 43II, and are additionally shown in dashed lines. The reception light signals 42II are incident on the mirror surface 34 and are likewise redirected to the receiving device 28 in accordance with the curvature of the displacement path 38 that is present there and provides a different angle of incidence than the curvature of the displacement path 38 in the zero position I.

Rather than a common mirror surface 34 for the transmitter light signals 22 and the reception light signals 42, separate mirror surfaces can also be provided for the transmitter light signals 22 and the reception light signals 42, The mirror surfaces can be mechanically coupled to one another so that they can be driven together, for example with a single drive device 36.

The reception light signals 42 are received with the receiving device 28. The receiving device 28 has a receiver with which the reception light signals 42 can be converted into for example electrical signals, which can be utilized with the control and evaluation device 30. The receiver can for example have at least one (avalanche) photodiode, at least one diode array and/or at least one CCD array or the like.

Furthermore, the receiving device 28 has an optical system, for example having an optical lens, with which the reception light signals 42 can be focused on the receiver.

The receiving device 28 is connected to the control and evaluation device 30 for the transmission of signals. In this way, the receiving device 28 can be controlled with the control and evaluation device 30. In addition, the signals of the receiving device 28 can be transmitted to the control and evaluation device 30 in this way.

The measurement system 12 can be controlled with the control and evaluation device 30. The control and evaluation device 30 is implemented using hardware and software technology. The elements of the control and evaluation device 30 can be implemented as a unit, for example in a shared housing. Alternatively, some of the elements or all elements of the control and evaluation device 30 can be implemented separately from one another.

Instead of a mirror surface 34, the redirection region can also have diffractive optical structures, for example diffractive optical elements. With the diffractive optical structures it is possible to change the direction of the transmitter light signals 22 and the reception light signals 42 in accordance with the position of the redirection region on the displacement path 38.

Figure 5:
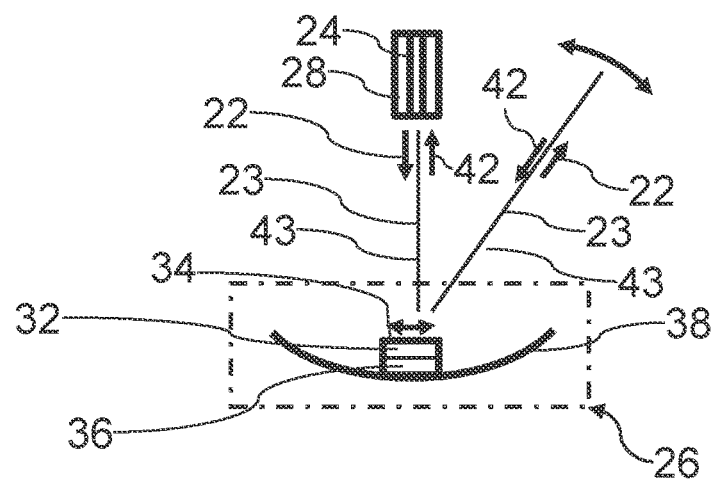
FIG. 5 shows a detailed view of a transmission device, a receiving device, and a light signal redirection device according to a second exemplary embodiment, which can be used in the measurement system from FIGS. 1 and 2.

FIG. 5 shows a light signal redirection device 26 according to a second exemplary embodiment. The elements that are similar to those of the first exemplary embodiment from FIGS. 3 and 4 are provided with the same reference signs. The second exemplary embodiment differs from the first exemplary embodiment in that the displacement path 38 is convexly curved when viewed from the transmission device 24 and the incident transmitter light signals 22 and reception light signals 42.

Figure 6:
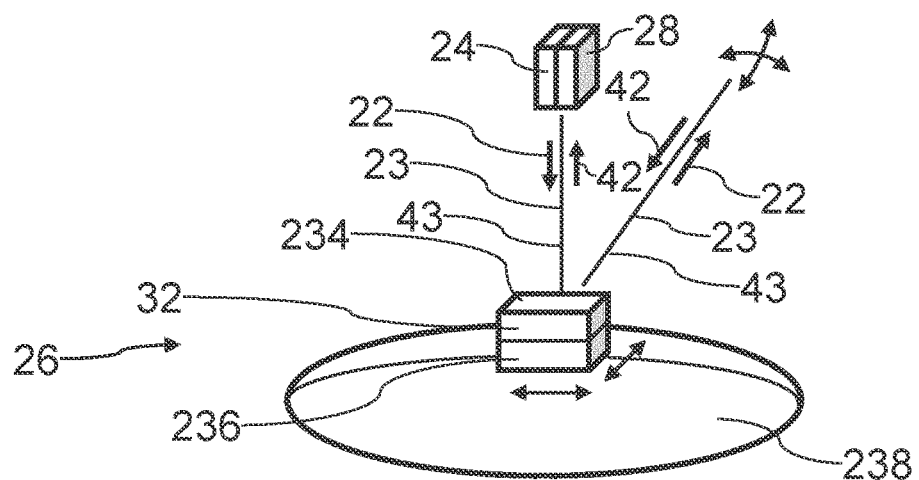
FIG. 6 shows a detailed view of a transmission device, a receiving device, and a light signal redirection device according to a third exemplary embodiment, which can be used in the measurement system from FIGS. 1 and 2.

FIG. 6 shows a light signal redirection device 26 according to a third exemplary embodiment. The elements that are similar to those of the first exemplary embodiment from FIGS. 3 and 4 are provided with the same reference signs. The third exemplary embodiment differs from the first exemplary embodiment in that a displacement path 238 of the redirection mirror 32 is curved in two dimensions. The mirror surface 234 can thus be displaced in two dimensions along the displacement path 238 using the corresponding drive device 236.

Using the light signal redirection device 26 according to the third exemplary embodiment, the propagation axes 23 of the transmitter light signals 22 can be swept into the monitoring region 14 in two dimensions. The monitoring region 14 can thus be scanned in two dimensions. Accordingly, reception light signals 42 can be redirected using the mirror surface 234 from the monitoring region 14 to the receiving device 28.

In the exemplary embodiment shown in FIG. 6, the propagation axes 23 of the transmitter light signals 22 and the propagation axes 43 of the reception light signals 42 coincide by way of example, so that only one axis is shown in each case for the sake of clarity.

The invention claimed is:

1. A light signal redirection device for an optical measurement system for capturing objects in a monitoring region,
   with at least one redirection body having at least one redirection region for redirecting light signals,
   with at least one drive device with which the at least one redirection body can be driven in such a way that the at least one redirection region can be moved relative to respective propagation axes of light signals which are incident on the at least one redirection region,
   at least one redirection region is displaceable along at least one at least partially curved displacement path,
   wherein the at least one drive device has or consists of at least one linear drive.

2. The light signal redirection device as claimed in claim 1, wherein a direction of the at least one redirection region follows the curvature of the displacement path when the at least one redirection body is displaced.

3. The light signal redirection device as claimed in claim 1, wherein an extension of the at least one redirection region in the direction of the at least one displacement path is smaller than an extension of the light signals in this direction.

4. The light signal redirection device as claimed in claim 1, wherein means for absorbing the light signals are provided in the direction of the light signals that are incident on the at least one redirection region behind, next to and offset behind the at least one redirection region.

5. The light signal redirection device as claimed in claim 1, wherein a displacement path of at least one redirection region is curved at least partially concavely and/or at least partially convexly when viewed in the direction of the incident light signals.

6. The light signal redirection device as claimed in claim 1, wherein at least one displacement path of at least one redirection region is curved at least partially parabolically and/or at least partially conically and/or at least partially elliptically and/or at least partially circularly.

7. The light signal redirection device as claimed in claim 1, wherein at least one displacement path is at least partially curved in one dimension and/or at least one displacement path is at least partially curved in two dimensions.

8. The light signal redirection device as claimed in claim 1, wherein at least one redirection region is periodically displaceable along the at least one displacement path.

9. The light signal redirection device as claimed in claim 1, wherein at least one redirection region has at least one mirror surface and/or at least one redirection region has at least one diffractive optical structure.

10. An optical measurement system for capturing objects in a monitoring region, comprising:
    at least one transmission device with which light signals are generated;
    at least one light signal redirection device, with which light signals are redirected;
    at least one receiving device with which light signals are received,
    wherein the at least one light signal redirection device has at least one redirection body having at least one redirection region for redirecting light signals; and
    at least one drive device with which the at least one redirection body is driven in such a way that the at least one redirection region is moved relative to respective propagation axes of light signals which are incident on the at least one redirection region
    wherein at least one redirection region is displaceable along at least one at least partially curved displacement path,
    wherein the at least one drive device has or consists of at least one linear drive.

11. A method for operating a light signal redirection device for an optical measurement system for capturing objects in a monitoring region, the method comprising:
    redirecting light signals with at least one redirection region of at least one redirection body;
    driving the at least one redirection body with at least one drive device in such a way that the at least one redirection region is moved relative to respective propagation of light signals which are incident on the at least one redirection region; and
    displacing the at least one redirection body along at least one at least partially curved displacement path, with the result that angles of incidence of the respective propagation axes of light signals on the at least one redirection region are changed and the light signals-are redirected,
    wherein the at least one drive device has or consists of at least one linear drive.

\* \* \* \* \*